US010229017B1

(12) United States Patent
Zou et al.

(10) Patent No.: US 10,229,017 B1
(45) Date of Patent: Mar. 12, 2019

(54) RESETTING FIBRE CHANNEL DEVICES FOR FAILOVER IN HIGH AVAILABILITY BACKUP SYSTEMS

(71) Applicant: EMC IP Holding Company LLC, Hopkinton, MA (US)

(72) Inventors: Colin Zou, Beijing (CN); Cory Gu, Beijing (CN); Oliver Yang, Beijing (CN); Victor Li, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 155 days.

(21) Appl. No.: 14/872,395

(22) Filed: Oct. 1, 2015

(51) Int. Cl.
*G06F 11/00* (2006.01)
*G06F 11/20* (2006.01)

(52) U.S. Cl.
CPC .... *G06F 11/2007* (2013.01); *G06F 2201/805* (2013.01); *G06F 2201/86* (2013.01)

(58) Field of Classification Search
CPC ............. G06F 11/2007; G06F 2201/86; G06F 2201/805
USPC ........................................................ 714/4.12
See application file for complete search history.

(56) References Cited

U.S. PATENT DOCUMENTS

| 6,578,158 | B1* | 6/2003 | Deitz | G06F 11/2092 714/11 |
| 8,990,520 | B1* | 3/2015 | Tang | G06F 12/1072 711/154 |
| 9,075,642 | B1* | 7/2015 | Chalmer | G06F 9/45533 |
| 2011/0113066 | A1* | 5/2011 | Middlecamp | G06F 11/004 707/783 |
| 2011/0219208 | A1* | 9/2011 | Asaad | G06F 15/76 712/12 |
| 2012/0044799 | A1* | 2/2012 | D'Souza | H04W 24/04 370/217 |
| 2014/0229769 | A1* | 8/2014 | Abraham | G06F 13/102 714/43 |
| 2016/0011948 | A1* | 1/2016 | Macdonald | G06F 11/2028 714/11 |
| 2018/0113731 | A1* | 4/2018 | Cheng | G06F 9/45558 |

OTHER PUBLICATIONS

PCI-SIG, Engineering Change Notice, Advanced Capabilities for Conventional PCI, 2006.*

* cited by examiner

*Primary Examiner* — Yair Leibovich
(74) *Attorney, Agent, or Firm* — Staniford Tomita LLP

(57) ABSTRACT

Embodiments for systems and methods of resetting network devices for failover operation, by receiving an operating system panic function call, disabling error reporting for all device ports of a device to be reset to prevent primary interrupts to a disk dump operation, performing a function level reset of the all the device ports to be reset, and performing the reset operation on the device in a single thread context to prevent secondary interrupts to the disk dump process.

16 Claims, 7 Drawing Sheets

RESETTING FIBRE CHANNEL DEVICES FOR FAILOVER IN HIGH AVAILABILITY BACKUP SYSTEMS

TECHNICAL FIELD

Embodiments are generally directed to high availability data storage systems, and more specifically to resetting Fibre Channel devices for failover.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern computer data storage systems, such as storage area networks (SAN) in enterprise environments often use the Fibre Channel (FC) network technology to provide high-speed (e.g., 2 to 16 gigabit/second) data transfers. A Fibre Channel network comprises a number of ports that are connected together, where a port is any entity that actively communicates over the network (either optical fiber or copper), where a port is usually implemented in a device such as disk storage or a Fibre Channel switch. The Fibre Channel protocol transports SCSI commands over Fibre Channel networks, and network topologies include point-to-point, arbitrated loop (devices in a ring), and switched fabric (devices/loops connected through switches).

As the amount of data in enterprise applications increases, the use of high availability (HA) storage networks utilizing FC devices has increased. A high availability storage framework allows transparent storage of the same data across several physically separated machines connected within a SAN or other TCP/IP network. For such systems, it is important that storage devices and data centers are able to be efficiently and quickly recover from failure conditions or even routine maintenance. In a high availability storage system, there are two nodes to provide storage services via Fibre Channel connections. When an HA active node is in a panic condition, it is expected that the surviving node will take over the Fiber Channel connections from the panicking node as soon as possible. The purpose is to keep providing service to the clients (initiators) at the other end of the FC network, e.g., in a VTL (Virtual Tape Library) service. Failover services from a failing node to the surviving node must occur as quickly as possible, as this is one of the most important goals of HA systems. However, it is challenging to failover FC connections to the surviving node.

At present, there are no standard solutions to this problem, though different brute force methods are typically used. One approach to failover an FC connection is to wait for OS panic to finish, and then reboot or shut down the system. When the system is powered off, the FC devices on the system are also powered off. However, it typically takes a very long time (e.g., on the order of minutes or even hours in a server with big kernel memory size) because the OS disk dump process during panic may take that much time, and there are no known ways to make the disk dump process any quicker. It is also possible to force a system reset and interrupt the OS disk dump process. In this case, however, the user will no longer have disk dumps, which is not desirable because the disk dump provides a lot of information of the system memory and software execution scenario during the panic period. It is also one of the most important ways to help user to analyze the panic problem and then fix the problem. Another possible approach is to let firmware reset the device. But this approach requires firmware changes and introduces complexity to the firmware. Compared to standard software changes, it is generally hard to develop and maintain firmware updates. Also, firmware is not an entirely reliable way to solve the problem considering the usage is in a high availability scenario. If it is considered to only reset some specific devices, then the appropriate device drivers could be updated to support reset. However, this requires changes for each driver and also requires that the hardware supports device specific reset functionalities.

With regard to the client (SCSI initiator) side and the overall topology, it is possible to configure multipath FC connections between clients and the two HA nodes. When one HA node fails, some of the clients may experience FC I/O failures, and then the I/O path will be switched to another path to the other HA node. However, there are no industry standards for multipath solution in an FC VTL initiator. Furthermore, it is quite difficult to implement multipath solutions for all of the initiators considering there are many different types of operating systems and network configurations.

What is needed therefore is a method of resetting FC host bus adapter devices when an operating system panic condition occurs and help failover FC connections as soon as possible, and to provide a disk dump process so that users continue to have crash dumps for panic analysis.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
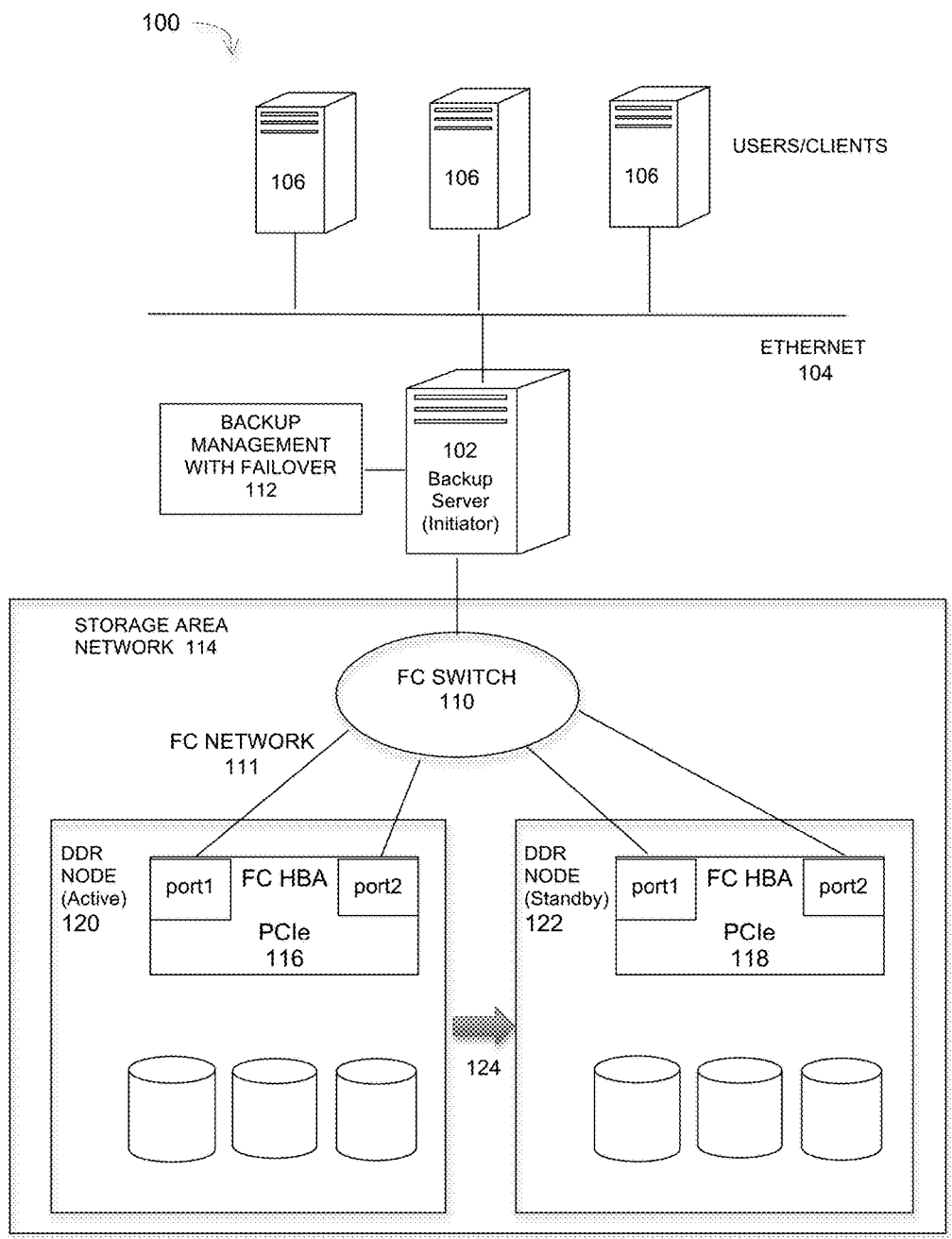
FIG. 1 illustrates a computer network system that implements one or more embodiments of a large-scale network implementing a failover process network devices, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

Disclosed herein are methods and systems of allowing a server operating system to reset an FC HBA device when in panic mode. As compared to present methods, it is much faster in that FC HBA ports can be reset in milliseconds, the FC switch ports are also turned to "No_Light" state immediately after HBA ports are reset. The FC connection can then be failover to the surviving node very quickly; it also allows the disk dump process to continue working, which avoids impacting disk dump and all other jobs during the OS panic period; it can be easily scaled to support any other PCIe devices; and easily allows for managing the policies by HA management modules (e.g., the HA manager daemon may want to set or update the FC reset policies, including which FC devices to be reset and which ones should be excluded). The approach also removes firmware dependency and avoids any firmware changes, thus saving development and maintenance costs.

Embodiments may be implemented in a data storage system that performs backup, archiving, and disaster recovery operations with deduplication functionality. The described embodiments allow for failover of FC HBA devices that provides fast failover and maintains disk dump operations. FIG. 1 illustrates a computer network system that implements one or more embodiments of a large-scale network implementing a failover process network devices, under some embodiments. As shown in system 100 of FIG. 1 a backup server 102 executes a backup management process 112 that coordinates or manages the backup of data from one or more data sources, such as client computers 106 operated by network users to storage devices in a storage area network (SAN) 114 that includes storage such as HDD (hard disk drives), SSD (solid state drives) and/or virtual storage devices. The network storage devices serve as target storage devices for data backed up from one or more data sources. In an embodiment, the storage devices comprise disk arrays having RAID controller cards that use the PCI Express (PCIe) high-speed serial bus standard.

For the embodiment of FIG. 1, the client computers 106 are coupled to the backup server 102 over an Ethernet network 104, though any other type of network may also be used. Also for the embodiment of FIG. 1, the backup server 102 is coupled to the storage devices through Fibre Channel (FC) switch 110 to a Fibre Channel (FC) network 111 that includes nodes 120, that may be embodied as DDR (Data Domain Replicator) nodes to provide network-efficient, encrypted replication for disaster recovery and backup, or other similar type of SAN nodes. Each node comprises an FC Host Bus Adapter (HBA) 116, 118, which each have two ports (denoted port1 and port2), with a number of storage devices (e.g., HDD or SSD). The backup server 102 takes user data from clients 106 and then it pass the data to the DDR nodes. The nodes export SCSI block interfaces via the FC networks (SAN) and FC HBA cards. The disks are a part of the DDR systems and may be either inside the DDR boxes or they are connected with DDR nodes via SAS (serial-attached SCSI) cables and SAS HBA cards, or other similar interfaces.

As shown in FIG. 1, storage area network (SAN) 114 provides connectivity to the various systems, components, and resources of system 100, and is implemented using FC protocols. For the FC network of FIG. 1, one or more host bus adapters (HBA) connect the host system to the other network and storage devices 114. The term host bus adapter generally refers to an FC interface card. Each HBA has a unique World Wide Name (WWN), which is similar to an Ethernet MAC address, but are longer (8 bytes). There are two types of WWNs on a HBA: a node WWN (WWNN), which is shared by all ports on an HBA, and a port WWN (WWPN), which is unique to each port.

The data generated or sourced by system 100 may be stored in any number of persistent storage locations and devices, such as in SAN 114, and the backup process 112 causes or facilitates the backup of this data to these storage devices, which may at least be partially implemented through storage device arrays, such as RAID components. For the embodiment of FIG. 1, network system 100, backup server 102 executes a backup management process 112 with a functional component that provides certain failover functions. The backup management process 112 automates the backup of network data using the target storage devices. In an embodiment, the process 112 uses certain known full and incremental backup techniques along with a process or system component to failover of FC devices in a fast and efficient manner and without requiring that devices be taken offline. Thus, one node (120) may be designated and function as an active node, which may failover 124 to a standby node 122 in the event of a failure condition of node 120.

As stated above, in an embodiment, system 100 may represent a Data Domain Restorer (DDR)-based de-duplication storage system, and backup server 108 may be implemented as a DDR De-duplication Storage server provided by EMC Corporation. However, other similar backup and storage systems are also possible. System 100 may utilize certain de-duplication processes, such as DD Boost (Data Domain Boost), which is a system that distributes parts of the de-duplication process to the backup server or application clients, enabling client-side de-duplication for faster, more efficient backup and recovery. A data storage deployment may use any combination of these interfaces simultaneously to store and access data.

In an embodiment, network 100 represents a network system that implements a high-availability storage framework that allows transparent storage of the same data across several physically separated machines connected within a SAN or other TCP/IP network. The storage server 102 performs deduplication tasks to deduplicate data during storage operations to maximize performance and minimize disk storage requirements. In an example implementation, the deduplicated data can be replicated for disaster recovery operations, or other similar applications. The backup server computer 102 may execute an operating system (OS) that consolidates both backup and archive data on the same infrastructure.

Although described with respect to SAN networks, it should be noted that system 100 may be implemented to provide support for various storage architectures such as Network-attached Storage (NAS), or Direct-attached Storage (DAS) that make use of large-scale network accessible storage devices 114, such as large capacity disk (optical or magnetic) arrays.

Failover Process

Embodiments include mechanisms for managing endpoint or FC device failover in high availability systems. Failover conditions may arise under a number of different conditions, such as hardware or software failures. In such a case, a kernel panic action is often taken by an operating system upon detecting an internal fatal error from which it cannot safely recover. The kernel routines that handle panics (known as panic( ) in Unix source code) are generally designed to output an error message, dump an image of kernel memory to disk (disk dump) for analysis and debugging, and then either wait for the system to be manually rebooted, or initiate an automatic reboot. A panic may occur as a result of a hardware failure or a software bug in the operating system; and though the OS may be capable of continued operation, the system is in an unstable state and rather than risk data corruption, the OS stops to prevent further damage and facilitate diagnosis and system restart.

Figure 2:
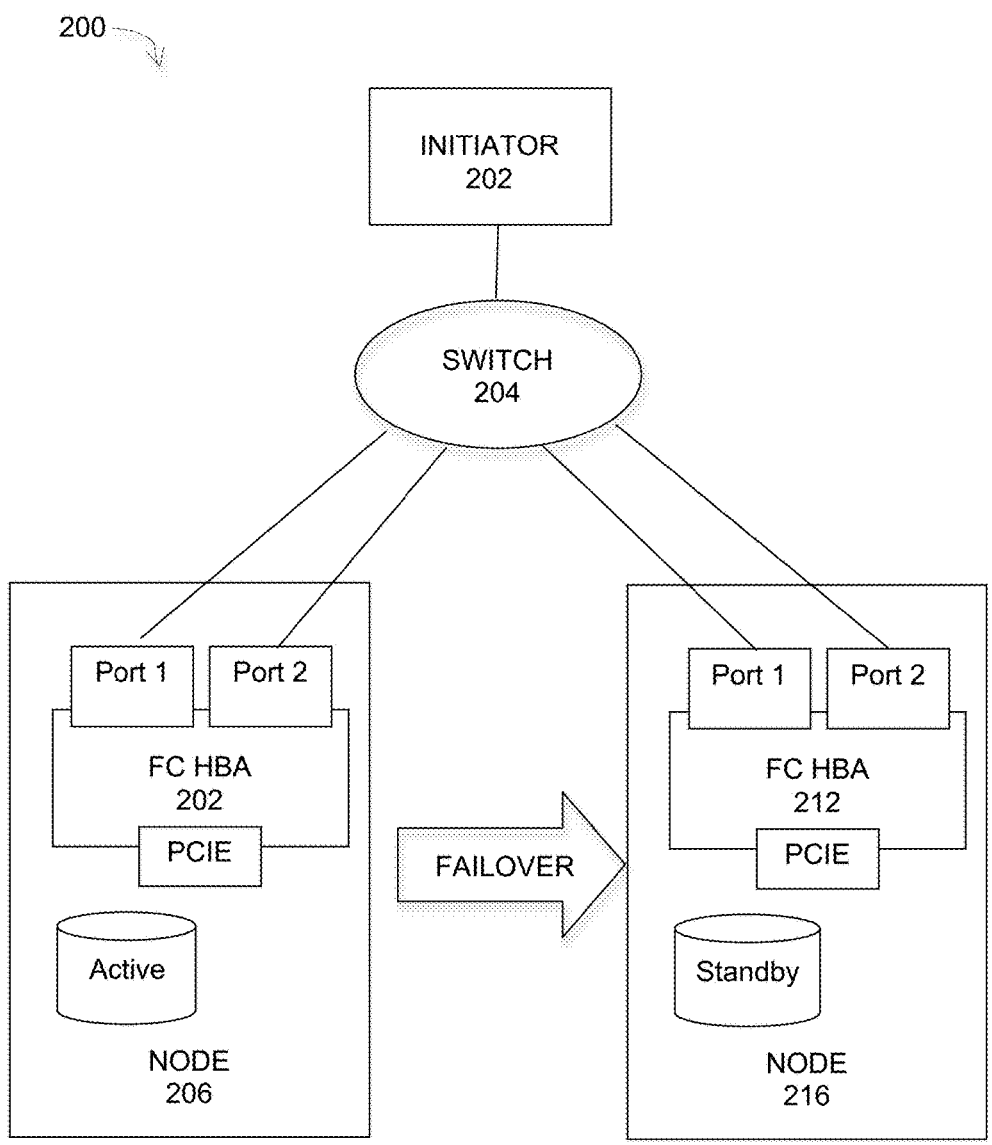
FIG. 2 illustrates a failover process in a high availability system, according to some embodiments.

In a high availability storage system, there are generally two nodes to provide storage services via Fibre Channel (FC) connections. When a HA active node is to panic, it is expected that, the surviving node would take over the Fiber Channel connections from the panicking node as soon as possible. The purpose is to keep providing service to the clients (initiators) at the other end of the FC network. FIG. 2 illustrates a failover process in a high availability system, according to some embodiments. In system 200, a SCSI initiator 202 through switch 204 communicates to the two ports (Port 1 and Port 2) of each node 206 and 216. Each node has a respective Fibre Channel HBA 202 and 212. Upon a kernel panic caused by a failing active node (206), the failover process switches to the standby node (216). The failover services from a failing node to the surviving node must be performed as quickly as possible to ensure the objective of a highly available system. Embodiments of a failover process implement methods to provide fast failover and maintain disk dump operations. In order to take over the FC connections, the surviving node needs to create FC endpoints with the same WWPN as the ones in the failing node. To create FC endpoints, it requires the FC switch ports connecting with the failing node firstly turn to "No_Light" state from "Online" state. In general, if the FC HBA ports are powered off or reset, the corresponding FC switch ports will go to "No_Light" state. This is the only way to achieve this state transition in this context of HA failover on panic. Embodiments of the failover process power off or reset the FC device on the failing node as soon as possible.

In the event of a failure condition caused by a failed port, a defined failover policy is executed. The SCSI Target shall initiate the failover process, which is triggered by a failed port. In an embodiment, the endpoint on the failed port shall fail over to its failover port if failover port is defined. The failover port is the designated physical port(s) where an endpoint will fail over if the original physical port (primary system address) fails. The failover port may be system or user defined as a failover system address. It is set per endpoint basis. In an implementation, the default failover port is set to none for each endpoint, which means the endpoint will not fail over on failure. The failover port could take a list of system addresses, and the order within the list reflects the sequence of physical ports which endpoint will fail over to. When the primary system address fails, the endpoint will fail over to the first available system address by following the sequence in the list. If later the failover system address also fails, then the endpoint will fail over to the next available address defined in the list. Once the last system address in the list is reached, the search will circle back to the beginning of the list. If none of the system addresses in the failover list is available, then the endpoint will be declared offline. The endpoint shall fail over based on a set method, which can be automatic or manual and system or user-configurable and set per endpoint basis. In automatic mode, if a failover port is defined, then the endpoint will automatically fail over to the failover port on failure.

Figure 3:
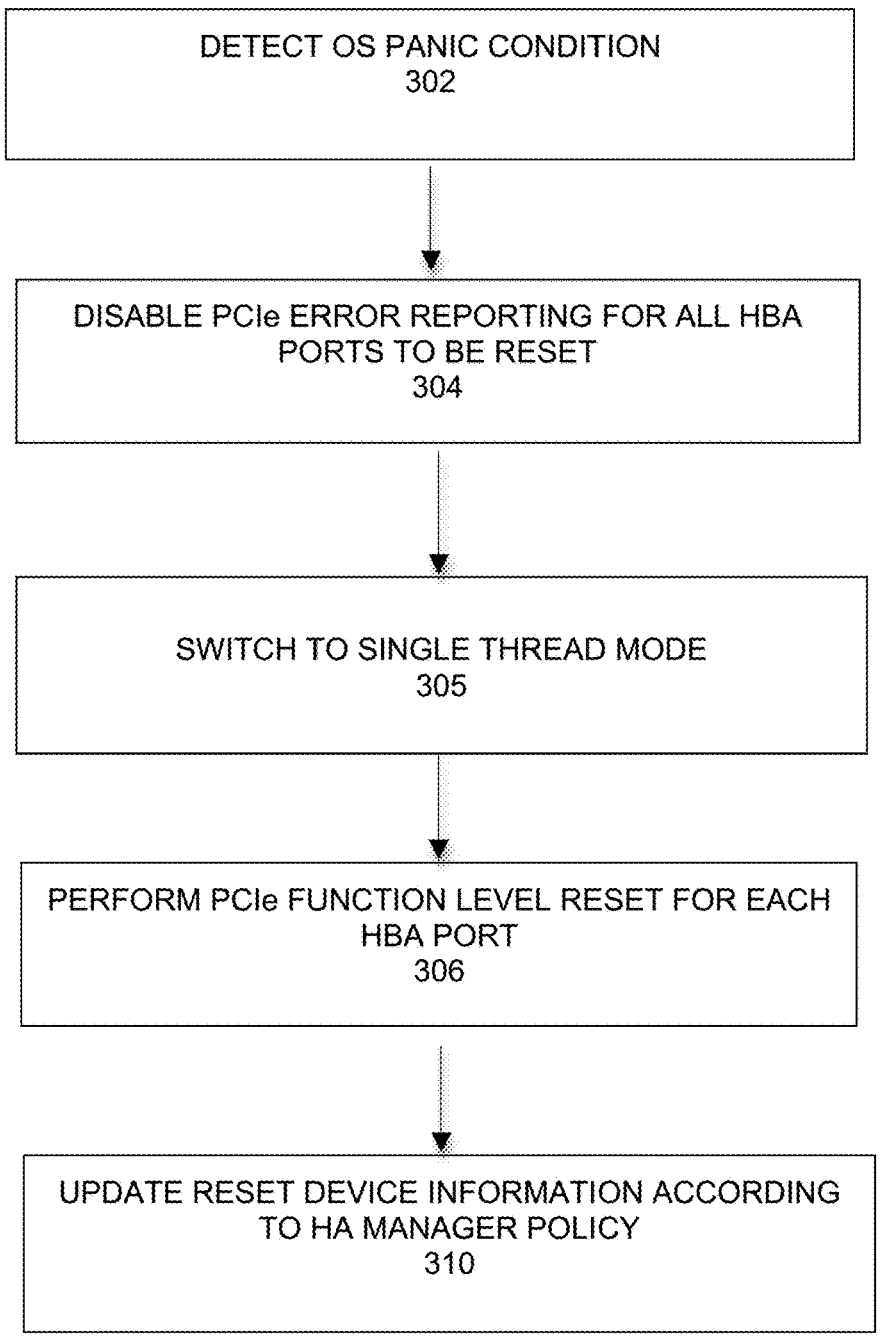
FIG. 3 is a flowchart that illustrates a process of performing an FC failover, under some embodiments.

FIG. 3 is a flowchart that illustrates a process of performing an FC failover, under some embodiments. The process begins with the detection of a panic function call, 302. An OS panic generally sets a function code such as a bad kernel flag or CPU trap. This can be caused by any failure condition, such as a software bug, hardware error, PCIe hardware problem, CPU error, memory error, or any other type of a failure. Before anything else, the process first disables the PCIe error reporting for all HBA ports to be reset, 304. This acts on the PCIe standard registers in the card to temporarily disable error reporting from the hardware, and is a key mechanism to allow the disk dump process to continue. By disabling error reporting, it avoids any error interrupts caused by reset of the PCIe card, as such error interrupts may break the disk dump process. The OS panic thread then switches to single thread mode after it executes some OS kernel functions, 305. Most kernels operate in multithread mode, so this step switches the OS operation to single thread mode instead of multithread, such as through a context switch. The use of single thread mode is another key to keeping the disk dump process intact. By resetting in single thread context, it avoids any secondary panic due to reset, as only one thread can be executed at a time, and other interrupts cannot be switched in. In an embodiment, the OS panic thread code may be updated to insert a function call to ha_reset_pci(void) (or similar function) where the OS thread is already in single thread mode.

Next, the OS issues commands to perform PCIe function level reset (FLR) for each of the FC HBA ports, 306. Alternatively, other known ways may also be used to reset HBA ports, however FLR is generally advantageous for HA failover purposes. As shown in step 310, the process then dynamically updates the reset device information to allow resetting the right devices according to HA manager's policy. This can be specified in a configuration file or user command input through a CLI (command line interface). The user can thus specify the specific card configuration for the reset condition. Different PCIe cards can be configured to allow the reset feature. In an embodiment, the configuration file may specify that all devices (cards) are enabled, and the CLI can be used to specify certain cards or card types to not be included.

Figure 4:
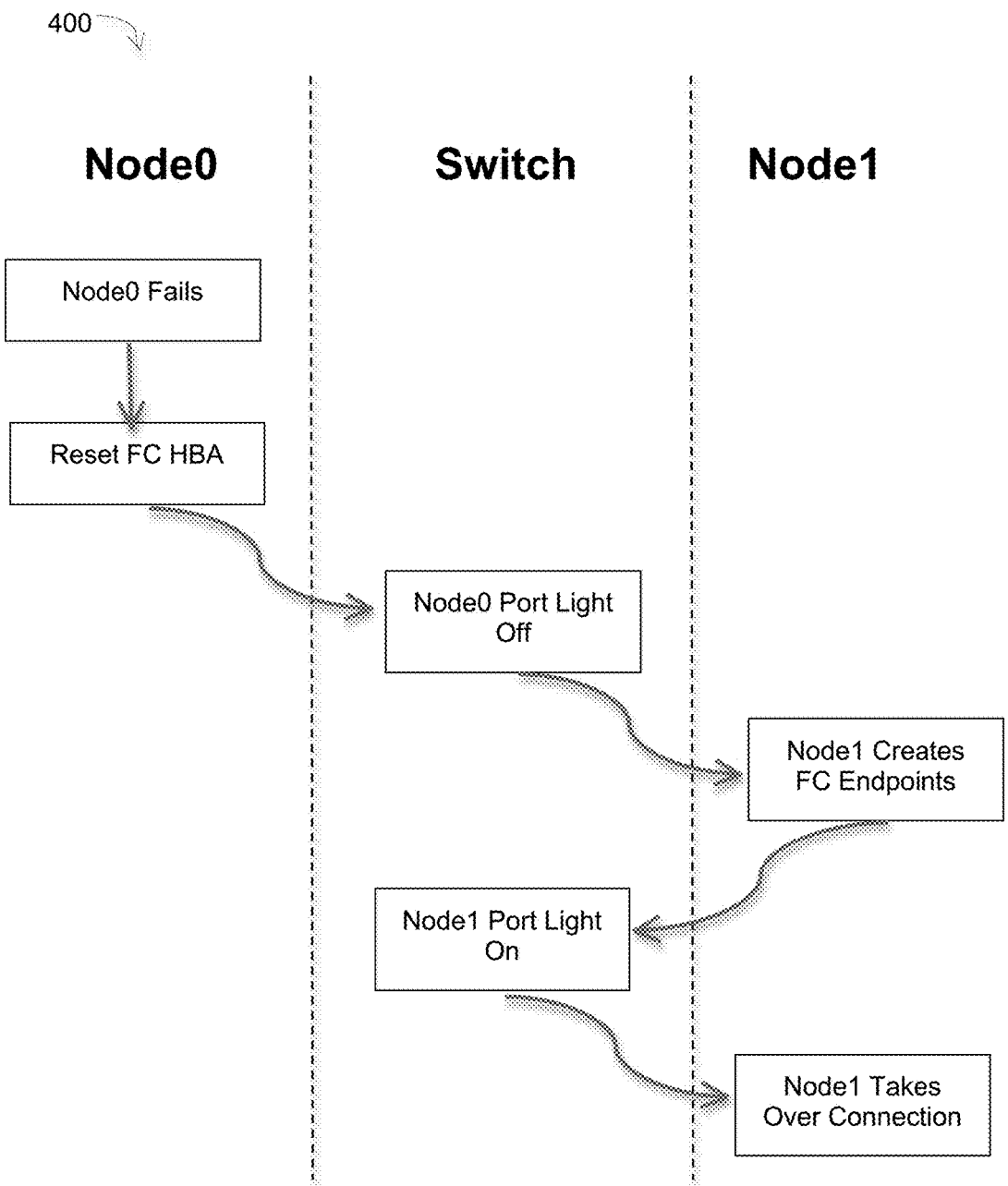
FIG. 4 is a flow diagram that illustrates a reset and failover sequence, under an embodiment.

FIG. 4 is a flow diagram that illustrates a reset and failover sequence, under an embodiment. FIG. 4 shows a sequence of events for each of Node0, a switch, and Node1 in terms of functions performed by each of these elements, where each Node is a computer. As shown in diagram 400, when the Node0 OS starts to panic as evidenced by a failed heartbeat, the OS issues a PCIe command to reset the FC HBA ports. In normal operation, this operation can be done on the order of milliseconds. With respect to the FC switch, the corresponding switch ports are immediately turned to a "No_Light" state because at the other end of the cable, the HBA ports already reset. The high availability system manager on the surviving node (Node1) is aware of the Node0 failing event via the heart beat signals between nodes, and Node1 creates FC endpoints in order to prepare to take over the service from Node0, in accordance with the FC protocol. After FC endpoints on Node1 are created, the corresponding switch ports connected with Node1 will go to "Online" state (light on). Node1 is then able to take over the FC connection from Node0, and the failover from Node0 to Node1 is complete. The failover method allows the system to quickly reset FC HBA ports and keep disk dump operations intact.

Figure 5:
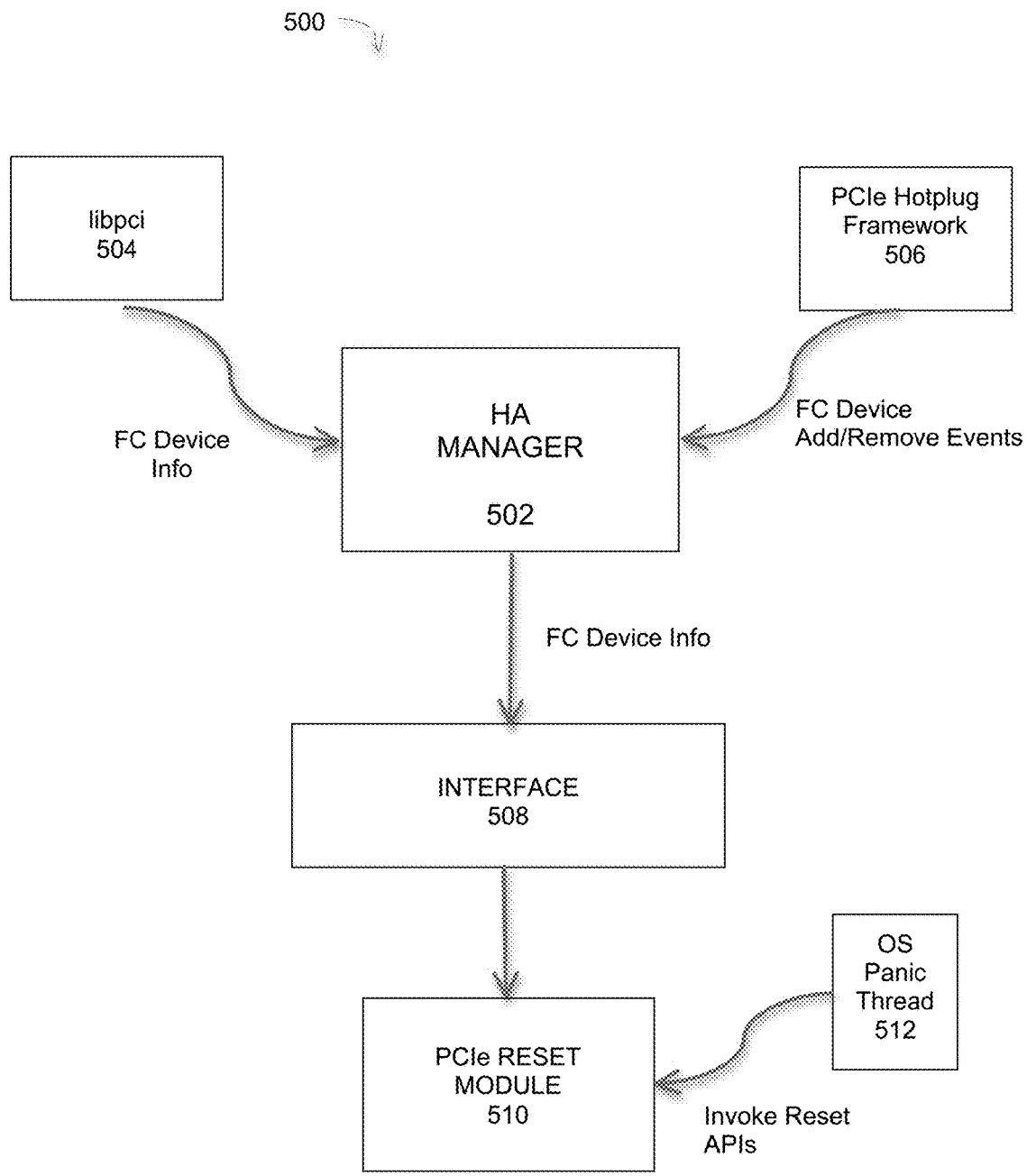
FIG. 5 is a block diagram of functional components that implement a panic reset process, under some embodiments.

FIG. 5 is a block diagram of functional components that implement a panic reset process, under some embodiments. As shown in diagram 500, a high availability (HA) manager 502 tracks devices within the systems, including devices that are to be reset. When HA manager 502 starts, it loads the panic reset policies and then invokes libpci 504 to collect the corresponding FC device information. The libpci 504 provides the following information PCIe domain number, BDF (bus, device, function numbers) of each FC port, PCIe capability register offset of each FC port, and any other appropriate information. The above information is needed for reset module routines to identify the device and the register offset. The HA manager also receives information from a PCIe Hotplug Framework, which specifies FC device add and remove events. The information of FC devices to be reset is passed via interface 508 to PCIe reset module 510. The HA manager may also read the configuration file to determine which of the devices are to be reset versus not reset. The configuration file is used to filter out resettable devices among all the devices in the system, for example three out of ten devices are to be reset, and the user command line can be used by the user to further deselect resettable devices among the three devices.

In an embodiment, the system defines certain panic reset policies that specify which devices should be reset at panic, and which are executed by the reset module 510. An OS panic thread 512 invokes the reset module and the PCIe reset module 510 will reset the appropriate device. An example policy may be for an Active-Passive case that resets all the active FC devices configured with clients. Depending on implementation, a reset FC device may not harm anything in a panic context, so the policy may simply be to reset all FC devices. Although it is also possible for reset module code to find out the devices according to device types, it is preferred to input the policies to the HA manager. The OS panic thread 512 for the kernel panic function is also input to reset module 510 and invokes or resets the appropriate APIs. This system 500 provides a way to dynamically specify which device can be reset using the panic reset module 510.

The interface 508 represents a software interface between the HA manager 502 and the PCIe reset module 510. Depending on the operating system (e.g., Unix or Linux), there may be different ways to implement such an interface. For example, on Linux, a "sysfs" entry can serve this interface purpose, such as:

/sys/module/ha/reset_pci_devices

The HA manager then writes FC device info to the above file entry. The following is an example:

cat /sys/module/ha/reset_pci_devices
0000:01:00.0,4c
0000:01:00.1,4c

Figure 6:
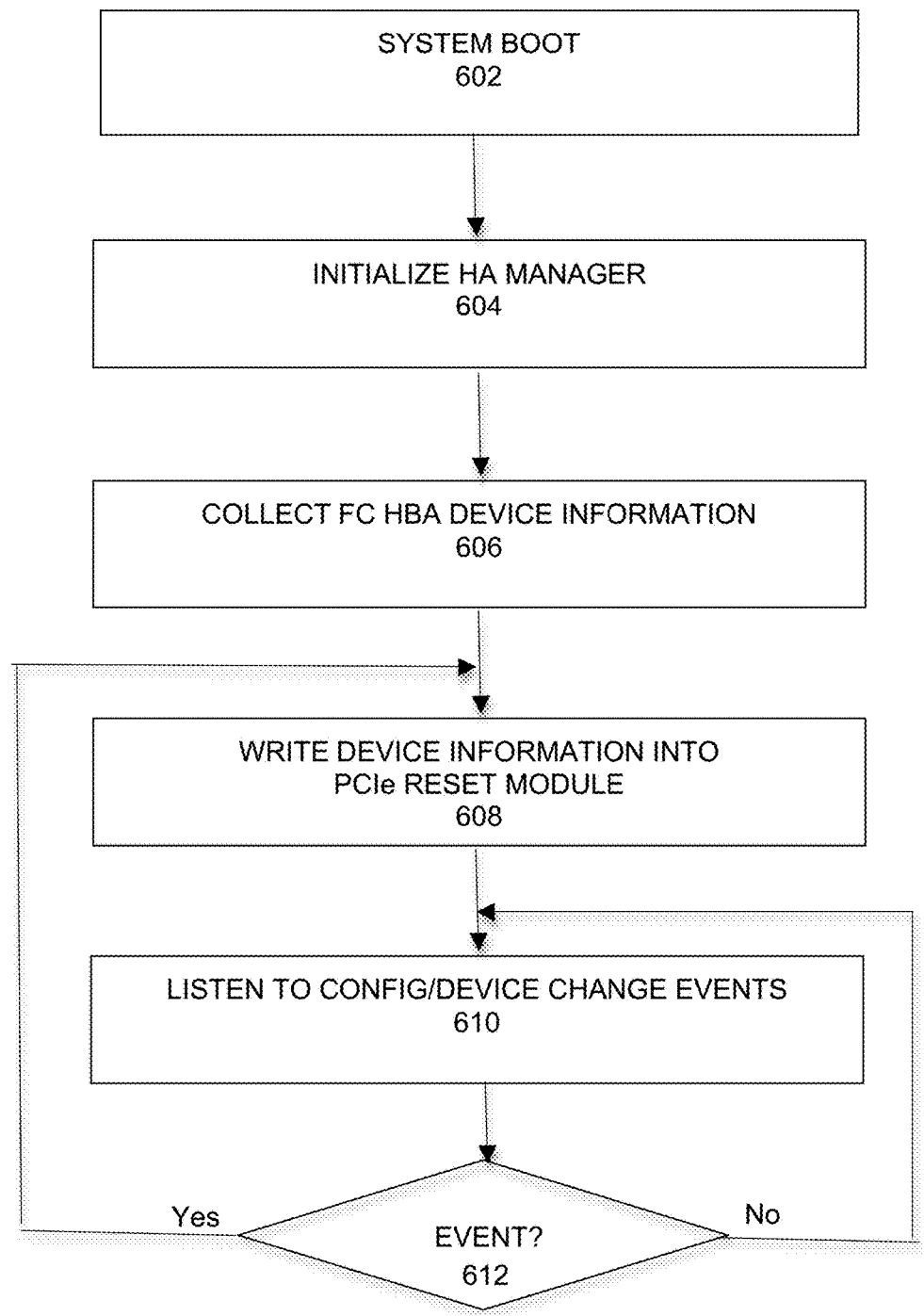
FIG. 6 is a flowchart that illustrates a method of collecting FC HBA device information, under some embodiments.

As stated above, the HA manager has knowledge of which devices should be reset when OS panic. This is obtained through a process that collects FC HBA device information. FIG. 6 is a flowchart that illustrates a method of collecting FC HBA device information, under some embodiments. As shown in FIG. 6, the process starts with a system boot, 602. Upon boot, a daemon process initializes 604 the HA manager to perform the device collection step, 606. This process searches through the system to find out PCIe device information. The collected device information is then written into the PCIe reset module 510, as shown in step 608. The process then listens for changes or events that change the configuration of the devices, and that result in updates or changes to the device information, 610. If an event occurs, as determined in decision block 612, the changed information is written to the PCIe reset module, otherwise the process loops to continue listening for an event. The event may be a user change to a device, such as a support engineer switching a device for debug, fix, or maintenance purposes, such as temporarily taking a device offline.

When the HA manager is started or restarted, it invokes libpci to collect the information of the devices to be reset on panic. One simple way to accomplish this is to just search for all the FC HBA devices and find out their BDF, capability, and base address. This is basically the industry standard way to specify a PCIe device. As mentioned in the section above, HA manager feeds the device information to the PCIe reset module via an interface. In order to handle dynamic changes/events for configuration changes or HBA device changes, the following approaches are taken: (1) load reset policies from a configuration file so that the policies can be easily updated; (2) update device info as per changes of HA configuration and IO configuration; (3) handle the PCIe hotplug events; and (4) when a FC device is hot added or removed, the HA manager updates the above "sysfs" file accordingly.

As shown in FIG. 5, the system includes a PCIe reset module 510 for executing the PCIe reset commands for HA failover purposes. This module exports HA APIs to the panic thread to perform an HBA reset. It also exports interfaces to the HA manager. The reset module is used primarily to execute commands or handle events, while the policy management is performed by the HA manager. This reset module exports interfaces to receive commands or information from HA manager. An example simple API that can be exported for panic reset is as follows:

int ha_reset_pci(void);

This API reads the device information from HA manager, and then does FLR reset for the HBA ports on a one-by-one basis.

Figure 7:
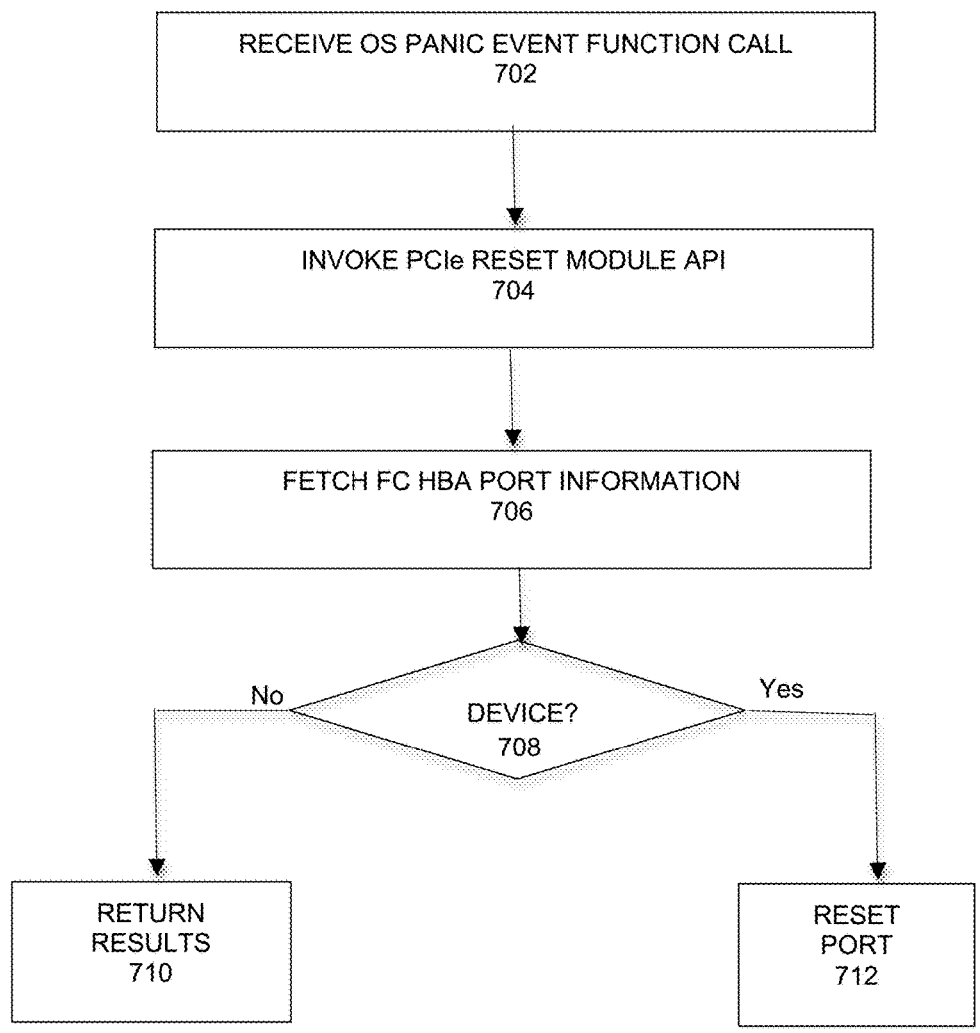
FIG. 7 is a flowchart that illustrates a process of performing device reset using a reset module, under some embodiments.

FIG. 7 is a flowchart that illustrates a process of performing device reset using a reset module, under some embodiments. The process begins with an OS panic event function call, 702. This invokes the PCIe reset module API in single thread mode to prevent interrupts, 704. The PCIe information is already written for devices to be reset. The FC HBA port information is then fetched for a device to be reset. In general, a PCIe card (network or FC card) has two ports, which the software sees as two devices. The HBA port information 706 thus equals the PCIe device information. The process then checks for other devices in decision block so that devices are handled on a one-by-one basis. If a device to be reset is present, as determined in decision block 708, the port is reset, 712, otherwise the appropriate results are returned, 710.

Reset Operation

In general, there are several different ways to power off or reset PCIe devices by the operating system. A first method is a hot reset of the PCIe slot. As per the PCIe spec, setting the register bit PCI_BRIDGE_CTL_BUS_RESET will reset the whole device under the PCIe down switch port or root port. However, it has been found that, in the case a two-ports FC HBA connecting with two FC switch ports, only one of the two FC switch ports goes to "No_Light" state after HBA reset. The other FC switch port keeps "Online" state. A second method is to power off the PCIe slot. This takes advantage of an optional capability to support power on/off PCIe slot as per the PCIe specification, though some machines may not support this capability. It has been found that toggling the slot power control register bits does not trigger any FC switch ports state transition. A third method is to perform a PCIe function level reset (FLR). As per the PCIe specification, FLR will reset each individual PCIe function. On a FC card, a FC port is corresponding to a function. It has been found that FLR works for all the FC HBA ports. That is, the corresponding FC switch ports all immediately went to "No_Light" state when the connected HBA ports were FLR reset. A fourth method is a vendor-specific case to perform a FC device specific reset. The FC hardware/firmware specification mentions some device reset approaches that may be defined by a vendor. This approach generally requires FC driver changes, however.

In general, the third method (FLR) is preferred due to certain advantages. First, FLR is generic and applies to all kinds of PCIe devices, and the software architecture is simpler, thus, there is less software dependency. Generally, reset on panic is the last resort for failing over FC connection, so the fewer dependencies, the better. By using the FLR method, no I/O driver modules need to be involved, and the PCIe hardware register programming for reset operation can be done via raw PCI access routines. One possible limitation of the FLR approach is that when the FC HBA hardware is broken and cannot take any PCIe configure space access commands from the OS, then the FLR reset operation may fail, though this rarely happens, and the other methods have this similar limitation as well.

In an embodiment a reset policy is defined regarding which PCIe devices should be reset during panic in order to failover. This information is passed to the HA manager, thus the interfaces between HA manager and the PCIe reset module should be provided to pass down the device information. The HA or I/O configuration could be changed by user or due to hardware or software failures during run-time. For example, if the user changes the HA configuration via administrator tools, or changes the I/O cards via PCIe hotplug administrator tools in the future. In an embodiment, the interfaces are configured to take changes at run-time to accommodate this feature.

As stated earlier, a key feature of the reset method is to keep disk dump operations intact. Disk dump operations are often utilized by enterprise-level systems such that in any OS panic situation, the memory context is automatically saved to disk. During this disk dump, all data is saved to disk, which can take on the order of many minutes or hours depending on the size of the system and amount of data. With respect to keeping disk dump operations intact, certain approaches are taken. First, the process disables the PCIe error reporting interrupts of the devices before resetting them. A device reset will trigger PCIe link down errors, which triggers SMI (settings management infrastructure) errors. The BIOS SMI handler will then reset the whole system before the disk dump is done. By disabling the error reporting, no SMI or other error reporting interrupts will be triggered. This also helps avoid corruption of the BMC SEL log and other error logs. Second, the reset operation is put into a single thread context during the panic process. The single thread context will make sure there are no risks for "secondary panic" conditions. When a device is reset, if there are some other threads that are accessing the device, then there would be risks for these secondary panics as the device is not in service during reset. If the reset is done in single thread context, then there is no chance for other threads to execute and no such risks. To make the reset operation happen soon after panic starts, the process resets before the disk dump kicks off. In general, the code execution time before disk dump is very short.

Besides failover procedures, embodiments may also apply to failback procedures, in which an endpoint will fail back to its original physical port or primary system address. The failback method can be automatic or manual, and system or user-configurable and set per endpoint basis. In manual mode, a user will manually perform failback operation on an endpoint to its original physical port once issue on the original port is resolved. In the automatic mode, the endpoint will fail back once link on the primary physical port comes up and remains up after the defined wait time period, which allows the link to achieve stability.

Although embodiments are described with respect to Fibre Channel systems, it should be noted that other transport protocols can also be adapted to use the virtualization methods described herein, including iSCSI and Fibre Channel over Ethernet (FCoE).

Embodiments may be applied to managing reset and failover in any scale of physical, virtual or hybrid physical/virtual network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform. It may also represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated and stored within the network may be stored in any number of persistent storage locations and devices, such as local client storage, server storage, or network storage. In an embodiment the network may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays, or flash memory devices.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of resetting network devices for failover operation, comprising:
   receiving an operating system panic function call;
   disabling error reporting for all device ports of a device to be reset;
   performing a function level reset of all device ports to be reset; and
   performing a reset operation on the device in a single thread context, wherein the failover operation switches network ports from a first node to a second node in a network, and wherein the network comprises a high availability Fibre Channel (FC) system implementing SCSI ports, and includes a server computer executing a data domain deduplication operating system, and further wherein the network comprises a storage area network, and wherein first and second SCSI ports each comprise one of a host bus adapter or a storage device port.

2. The method of claim 1, wherein each node comprises a FC host bus adapter (HBA) having two ports, the method further comprising:
   switching ports of the first node to a No-Light state after the reset operation; and
   switching ports of the second node to a Light_On state after a failover.

3. The method of claim 1 wherein the panic function call comprises an operating system function call indicating a failure condition due to one of a hardware failure or a software bug.

4. The method of claim 3 wherein the error reporting disabling and the single thread reset operation allow for a disk dump operation to continue by preventing other and secondary interrupts from interrupting the disk dump operation.

5. The method of claim 4 wherein the disk dump operation comprises an automatic process initiated by the operating system upon the failure condition, and comprises a full context of system memory at the time of the failure condition is saved to disk.

6. The method of claim 2 wherein the function level reset comprises an PCIe (peripheral component interconnect express) standard reset function that resets each individual PCIe function in the device.

7. The method of claim 1 further comprising passing PCIe standard device information from a plurality of devices from a manager component to a reset module through a device information interface, wherein the device is specified within a configuration file defining a subset of devices within the plurality of devices that are to be reset upon the failure condition, and wherein the configuration file may be modified by user command through a command line interpreter.

8. The method of claim 7 further comprising defining failover policies that govern execution of the failover operation and include parameters selected from a group consisting of: failure trigger conditions, wait times for initiation of port transfer, address and sequence of backup physical ports, and manual/automatic initiation of the failover operation.

9. A system for resetting network devices for failover operation, comprising:
 a first interface receiving an operating system panic function call;
 a hardware manager component disabling error reporting for all device ports of a device to be reset;
 a reset module coupled to the manager component and performing a function level reset of all device ports to be reset, and performing the reset in a single thread context to allow the failover operation to switch network ports from a first node to a second node in a network, wherein the network comprises a high availability Fibre Channel (FC) system implementing the SCSI ports, and includes a server computer executing a data domain deduplication operating system, and further wherein the network comprises a storage area network, and wherein first and second SCSI ports each comprise one of a host bus adapter or a storage device port.

10. The system of claim 9, wherein each node comprises a FC host bus adapter (HBA) having two ports, the manager further:
 switching ports of the first node to a No-Light state after the reset operation; and
 switching ports of the second node to a Light_On state after a failover.

11. The system of claim 9 wherein the panic function call is input to the reset module through a second interface, and comprises an operating system function call indicating a failure condition due to one of a hardware failure or a software bug.

12. The system of claim 11 wherein the error reporting disabling and the function level reset allow for a disk dump operation to continue by preventing other and secondary interrupts from interrupting the disk dump operation.

13. The system of claim 12 wherein the disk dump operation comprises an automatic process initiated by the operating system upon the failure condition, and comprises a full context of system memory at the time of the failure condition is saved to disk.

14. The system of claim 13 wherein the function level reset comprises an PCIe (peripheral component interconnect express) standard reset function that resets each individual PCIe function in the device.

15. The system of claim 14 further comprising a device information interface that passes PCIe standard device information from a plurality of devices from the manager component to the reset module, and wherein the device is specified within a configuration file defining a subset of devices within the plurality of devices that are to be reset upon the failure condition, and wherein the configuration file may be modified by user command through a command line interpreter.

16. A computer program product comprising a non-transitory computer usable medium having machine readable code embodied therein for resetting network devices for failover operation, by:
 receiving an operating system panic function call;
 disabling error reporting for all device ports of a device to be reset;
 performing a function level reset of all device ports to be reset; and
 performing a reset operation on the device in a single thread context, wherein the failover operation switches network ports from a first node to a second node in a network, and wherein the network comprises a high availability Fibre Channel (FC) system implementing the SCSI ports, and includes a server computer executing a data domain deduplication operating system, and further wherein the network comprises a storage area network, and wherein first and second SCSI ports each comprise one of a host bus adapter or a storage device port.

* * * * *